(12) United States Patent
Reefman et al.

(10) Patent No.: US 7,302,303 B2
(45) Date of Patent: Nov. 27, 2007

(54) MIXING SYSTEM FOR MIXING OVERSAMPLED DIGITAL AUDIO SIGNALS

(75) Inventors: Derk Reefman, Eindhoven (NL); Bernardus Antonius Maria Zwaans, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 477 days.

(21) Appl. No.: 10/502,171

(22) PCT Filed: Dec. 23, 2002

(86) PCT No.: PCT/IB02/05710

§ 371 (c)(1),
(2), (4) Date: Jul. 21, 2004

(87) PCT Pub. No.: WO03/063158

PCT Pub. Date: Jul. 31, 2003

(65) Prior Publication Data

US 2005/0075744 A1    Apr. 7, 2005

(30) Foreign Application Priority Data

Jan. 23, 2002    (EP) ................................. 02075280

(51) Int. Cl.
*G06F 17/00*    (2006.01)

(52) U.S. Cl. ......................................... 700/94; 381/119

(58) Field of Classification Search ................ 381/106, 381/119, 94.8, 104–109; 700/94; 341/200, 341/126, 143, 50
See application file for complete search history.

(56) References Cited

U.S. PATENT DOCUMENTS

| 5,581,480 A | 12/1996 | Olson et al. |
| 6,041,080 A * | 3/2000 | Fraisse ....................... 375/242 |
| 6,255,975 B1 * | 7/2001 | Swanson ..................... 341/143 |
| 6,285,767 B1 * | 9/2001 | Klayman ..................... 382/17 |
| 2002/0036578 A1 * | 3/2002 | Reefman ..................... 341/143 |

* cited by examiner

*Primary Examiner*—Vivian Chin
*Assistant Examiner*—Lun-See Lao

(57) ABSTRACT

A mixing system for mixing a plurality of digital audio signals, at least one of which is a noise-shaped oversampled digital audio signal having a predetermined sampling frequency and bit resolution, said system comprising a summing unit for computing a sum signal of said plurality of input signals; a clipping unit having an input for receiving said sum signal, said clipping unit clipping said sum signal; further comprising a filter unit between the input terminals and the clipping unit, arranged to selectively suppress frequency components outside an audio frequency band from the sum signal; and a converter unit arranged to receive a clipped sum signal from the clipping unit and to convert said clipped sum signal into an output signal of said bit resolution, using noise-shaping, the clipping unit being arranged to limit the input values to a range of values that the converter is able to handle in a stable manner.

20 Claims, 2 Drawing Sheets

MIXING SYSTEM FOR MIXING OVERSAMPLED DIGITAL AUDIO SIGNALS

The invention relates to a mixing system for mixing a plurality of noise-shaped oversampled digital audio signals having a predetermined sampling frequency and bit resolution, said system comprising a summing unit having a plurality of input terminals each for receiving a respective one of said plurality of audio signals, for computing a sum signal of said plurality of input signals, and a clipping unit having an input for receiving said sum signal, said clipping unit clipping said sum signal.

U.S. Pat. No. 5,581,480 discloses a mixer that sums a number of sampled audio signals. The samples are represented using the well known Pulse Code Modulation technology (PCM), wherein signal amplitudes are represented as multi-bit (for instance 8-16 bit) words. In this technology, a sampling frequency is used which is at least the minimal sampling frequency according to the Nyquist theorem, which, as is well known, is at least twice the signal bandwidth.

The mixer disclosed in this publication has a clipper for keeping the mixed signal in a range of values that can be represented with the same resolution as the input signals (generally 8 or 16-bit resolution). Such a clipper reduces a sum of two audio samples to a lower value if said sum exceeds a maximum value, for instance the maximum value that is representable by 8 or 16 bits.

Although 8 or 16-bit PCM signals are a useful way of representing audio signals, they have certain drawbacks due to their large word size. As an alternative, it has been proposed to use "noise-shaped oversampled" audio signals instead of PCM signals with such a large word size. Noise-shaped oversampled audio signals involve one or a few bits per sample at a sampling frequency well above the Nyquist frequency of the audio signal. The basic idea of such signals is that the signal is represented in such a way that the spectral density of the large quantization errors that are the consequence of using a small number of bits is concentrated at least substantially outside the audio bandwidth in the extra bandwidth available due the high sampling frequency.

As an example, in a format known as a standard DSD (Direct Stream Digital)-signal, audio contents are stored as a 1-bit sample stream with a sampling rate of 2.8 MHz. As an alternative, a slightly higher resolution, such as 2 bits per sample may be used.

Such noise-shaped oversampled sample streams offer a possibility to use a relatively low bit resolution with low audible noise, because in reconstructing an audio fragment from the samples, multiple samples may be used to improve the signal resolution. Moreover, it has become apparent that the human auditory system appreciates this recording technology better than the traditional PCM-recording technology, even though the sample stream, may have a very small, even one-bit, resolution.

It is desirable to mix such noise-shaped oversampled signals in such a way that a mixed signal with the same sampling frequency is produced. Thus, a mixer can be incorporated in a system in which noise-shaped oversampled signals communicate between system components.

However, when such noise-shaped oversampled audio signals are mixed, the mixed signal would be severely distorted if one uses clipping such as disclosed in U.S. Pat. No. 5,581,480 to reduce the mixed signal to a lower value if said sum exceeds a maximum value.

Therefore, it is an object of the invention to provide a mixing system that mixes noise-shaped oversampled signals to produce a noise-shaped oversampled output signal which suffers less from distortion.

To achieve the above-mentioned object, according to the invention, the mixing system described in the preamble comprises:
 a filter unit between the input terminals and the clipping unit, arranged to selectively suppress frequency components outside an audio frequency band in the input signals and/or the sum signal; and
 a converter unit arranged to receive a clipped sum signal from the clipping unit and to convert said clipped sum signal into an output signal of said bit resolution, using noise-shaping, the clipping unit being arranged to limit the input values to a range of values that the converter is able to handle in a stable manner.

According to the invention, the converter converts the mixed signal back to the low resolution by means of noise shaping. The clipping unit limits the input values to the converter, to a range that can be handled by the converter. This should be contrasted with the clipping unit of U.S. Pat. No. 5,581,480, which functions to keep the signal amplitude in the desired range representable by a specific PCM-bitword and thereby performs the actual conversion function. The latter range is much narrower than the range that can be handled by the converter.

However, by applying a clipping operation, non-linear effects are introduced. The non-linearity of said clipping function has the effect of folding back quantization noise from the input signals from above the audio band back into the audible spectrum. In low-resolution signals, the quantization noise is relatively strong. The mixing system according to the invention suppresses high-frequency components from the signal before clipping, so as to reduce foldback due to the non-linear character of said clipping operation.

In a preferred embodiment, said filter unit is comprised in an input channel and filters said input signals in order to limit an audio bandwidth of said input signals. Such a position has the advantage that the reduction of bandwidth mitigates the requirements on digital processing speed. Preferably, said first and second sampling frequencies are equal in magnitude; more specifically, said input signals and/or said output signals are of the above-mentioned DSD-format.

In a further preferred embodiment, said convertor unit comprises a Sigma-Delta Modulator. Furthermore, the clipped signal may be maximized to a clip level compliant with said Sigma-Delta Modulator. Specifically, said signal output may be maximized to −3 dB as compared to the amplitude output of the Sigma-Delta Modulator.

Said input channel may comprise a down-sampling unit for down-sampling said input signal. Such a down-sampling unit has the advantage that the reduction of bandwidth mitigates the requirements on digital processing speed.

In order to output an output signal having the required second sampling frequency, said convertor unit may comprise an up-sampling unit.

In order to achieve pleasant psycho-acoustical properties, the clipping unit may be of a soft clipping type.

The invention further relates to a method of mixing a plurality of audio input signals having a first predetermined sampling frequency and bit resolution, said sampling frequency being relatively high with respect to an audio band width and said bit resolution being relatively low, the method comprising the steps of receiving a respective one of said plurality of audio signals, computing a sum signal of said plurality of input signals, selectively suppressing frequency components outside an audio frequency band in the input signals and/or the sum signal, clipping said sum signal, and converting said clipped sum signal into an output signal of said bit resolution, using noise-shaping, the clipping unit being arranged to limit the input values to a range of values that the converter is able to handle in a stable manner.

The method may further comprise the step of limiting an audio bandwidth of said input signals.

The invention also relates to an audio system comprising a mixing system according to the above-mentioned aspects, for mixing a plurality of noise-shaped oversampled digital audio signals having a predetermined sampling frequency and bit resolution.

Further objects and features of the invention will become apparent from the drawings, wherein.

Figure 1:
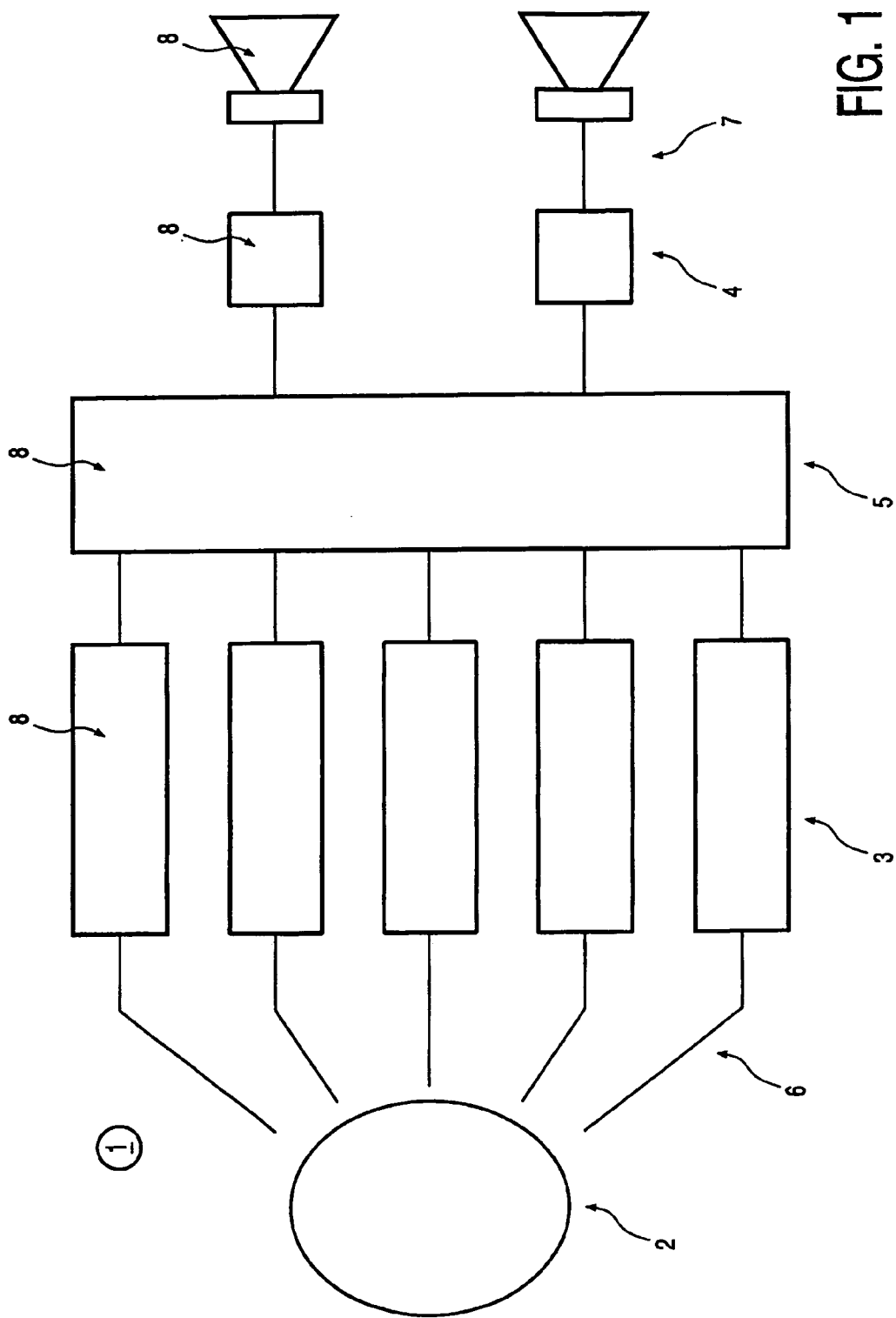
FIG. 1 is a schematic illustration of an audio system having a mixing system according to the invention.
Figure 2:
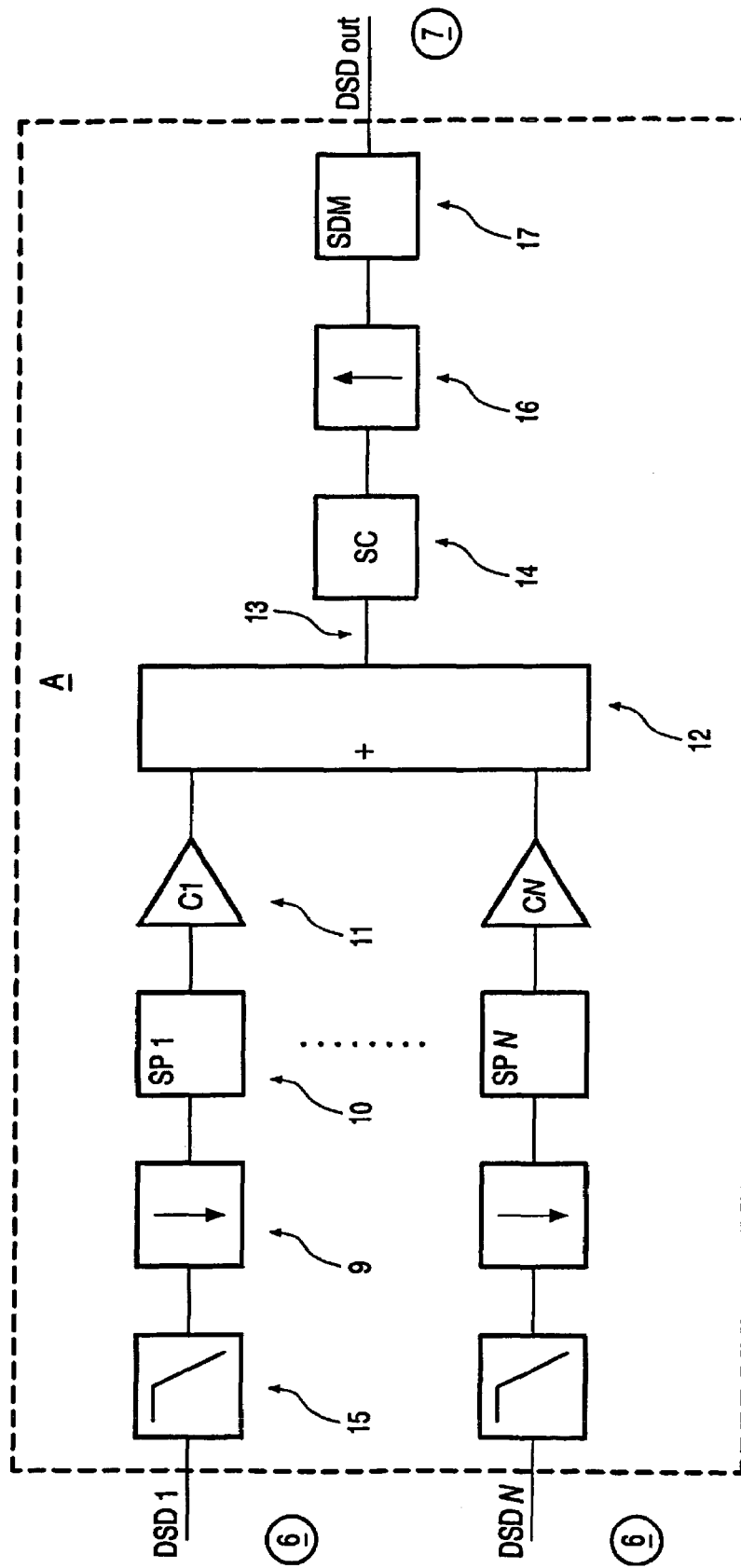
FIG. 2 is a schematic illustration of an embodiment of the mixer according to the invention.

In FIG. 1, a generic setup of an audio playing system 1 is illustrated, which is able to utilize audio information contained in a multichannel recording of a Super Audio CD 2 optimally for audio setups that have fewer output channels than a number of recorded channels. As an example, the number of input channels 3 in FIG. 2 is five, and the number of output channels 4 is two. To this end, audio system 1 comprises a mixer 5 for mixing said plurality of noise-shaped oversampled digital audio signals 6 having a predetermined sampling frequency and bit resolution. An example of such a noise-shaped oversampled signal 6 is a DSD-signal format, storing signal contents as a 1-bit sample stream with a (very high) sampling rate of 2.8 MHz, in contrast to traditional recording technologies (known as PCM or Pulse Code Modulation) which store signals as multi-bit words. The format is able to provide an excellent audio quality and forms the standard for the successor to the conventional CD record carrier: the Super-Audio Compact Disc (SACD).

Although in this description, a sample stream is used, which is constituted by single-bit samples, the sample stream may be formed in practice by samples which are larger than one bit. The invention is applicable in all cases where oversampling is applied in order to eliminate quantization noise effects due to a limited bit resolution of the bits used in the sample stream. After mixing, the setup of FIG. 1 provides output signals 7 at the required sampling frequency and bit resolution, thereby creating the possibility to provide a modular signal processing system comprising processing modules 8 that are arranged to provide a required trade-off in cost-effectiveness and/or quality.

In FIG. 2, mixer 5 comprises a plurality of input channels 3. In this example, each channel 3 comprises a down-sampling unit 9. By reducing the sample rate of the input signals 6, more cost-effective signal processing is feasible by signal processors 10, present in said input channel 3.

After signal processing, the signal 6 is weighted with a scaling factor C1-CN in scaling stage 11. The signals 6 are then added in an adding unit 12, to produce a mixed signal 13. After adding, a clipping unit 14 clips mixed signal 7 to limit said mixed signal 13 to a maximum signal amplitude.

Due to the clipping unit 14, non-linear effects are introduced in the signal processing, which amount to frequency doubling and mixing. Therefore, frequency components related to quantization noise, which are present quite strongly in very high-frequency bands, are mapped back into the audible spectrum. To eliminate such a foldback of high-frequency noise, a filter unit 15 is introduced before clipper 14. This filter 15 is able to eliminate frequency components comprised in said (mixed) signal 6, 13 originating from said bit resolution.

Filter 15 may be placed anywhere before the clipper to achieve the desired filtering of high-frequency quantization noise. As an example, not depicted in FIG. 1, filter 15 may, in principle, be placed after mixer 5. However, a preferable position of filter 15 is to combine such a filter with down-sampling unit 9, as depicted in FIG. 1. In this position, a more cost-effective signal processing can be performed by reducing the reproduced audioband spectrum. When sufficiently reduced, the sampling frequency may also be reduced while maintaining an acceptable signal resolution at the same time.

In this way, the function of eliminating high-frequency quantization noise and reducing the reproduced audio spectrum are combined in a single filter stage 15.

The output of adding unit 5 is multi-bit, due to various signal processing steps, scaling and adding of signal 6. To convert signal 6 into the desired format of output signal 7, an up-sampling unit 16 and a converter 17, preferably a Sigma-Delta Modulator are introduced. Such a converter 17 is essentially a differentiator, outputting only increments of signal 13 as 1-bit values. Up-sampling may be achieved by a number of well-known routines, for example, sample-and-hold or interpolation.

Practical input values of a Sigma-Delta Modulator need to be under −3 dB in order to yield a stable outcome, so that the input voltage range is limited by −3 dB from the binary output voltages of the Sigma-Delta Modulator. The clipper 14 is preferably designed to limit the input values inputted in converter 14.

In order to obtain a pleasant auditory perception of the outputted signal 7, a clipper 14 of the soft type is used, which limits the number of higher order frequencies introduced by rounding of the edges of the clipping function.

It will be clear to those skilled in the art that the invention is not limited to the embodiments described with reference to the drawing but may comprise all kinds of variations thereof. These and other variations are deemed to fall within the scope of protection of the appended claims.

The invention claimed is:

1. A mixing system for mixing a plurality of digital audio signals, at least one of which is a noise-shaped oversampled digital audio signal having a predetermined sampling frequency and bit resolution, said system comprising:
    a summing unit having a plurality of input terminals each for receiving a respective one of said plurality of digital audio signals, for computing a sum signal of said plurality of digital audio signals;
    a clipping unit having an input for receiving said sum signal, said clipping unit clipping said sum signal;
    a filter unit between the input terminals and the clipping unit, arranged to selectively suppress frequency components outside an audio frequency band from the sum signal; and
    a converter unit arranged to receive a clipped sum signal from the clipping unit and to convert said clipped sum signal into an output signal of said bit resolution, using noise-shaping, the clipping unit being arranged to limit the input values to a range of values that the converter is able to handle in a stable manner.

2. A mixing system as claimed in claim 1, characterized in that said filter unit is comprised in an input channel and filters said digital audio signals in order to limit an audio bandwidth of said digital audio signals.

3. A mixing system as claimed in claim 1, wherein sampling frequencies of the digital audio signals and the output signal are equal in magnitude.

4. A mixing system as claimed in claim 1, wherein said digital audio signals and said output signal are of a DSD-format.

5. A mixing system as claimed in claim 1, characterized in that said convertor unit comprises a Sigma-Delta Modulator.

6. A mixing system as claimed in claim 5, characterized in that the clipped signal is maximized to a clip level compliant with said Sigma-Delta Modulator.

7. A mixing system as claimed in claim 6, characterized in that said signal output is maximized to −3 dB as compared to the amplitude output of the Sigma-Delta Modulator.

8. A mixing system as claimed in claim 1, further comprising one or more down-sampling units for down-sampling said digital audio signals before the digital audio signals are applied to the summing unit.

9. A mixing system as claimed in claim 1, wherein said convertor unit comprises an up-sampling unit.

10. A mixing system as claimed in claim 1, characterized in that the clipping unit is of a soft clipping type.

11. An audio system comprising a mixing system as claimed in claim 1 for mixing a plurality of noise-shaped oversampled digital audio signals having a predetermined sampling frequency and bit resolution.

12. The mixing system of claim 2, wherein sampling frequencies of the digital audio signals and the output signal are equal in magnitude.

13. The mixing system of claim 2, wherein said digital audio signals and said output signal are of a DSD-format.

14. The mixing system of claim 3, wherein said digital audio signals and said output signal are of a DSD-format.

15. The mixing system of claim 2, wherein said convertor unit comprises a Sigma-Delta Modulator.

16. The mixing system of claim 3, wherein said convertor unit comprises a Sigma-Delta Modulator.

17. The mixing system of claim 4, wherein said convertor unit comprises a Sigma-Delta Modulator.

18. A method of mixing a plurality of noise-shaped oversampled digital audio signals having a predetermined sampling frequency and bit resolution, the method comprising:
   receiving a respective one of said plurality of digital audio signals;
   computing a sum signal of said plurality of digital audio signals;
   selectively suppressing frequency components outside an audio frequency band in at least one of the digital audio signals and the sum signal;
   clipping said sum signal; and
   converting said clipped sum signal into an output signal of said bit resolution, using noise-shaping, the clipping unit being arranged to limit values of the sum signal to a range of values that the converter is able to handle in a stable manner.

19. A method as claimed in claim 18, wherein the method further comprises the step of limiting an audio bandwidth of said digital audio signals.

20. A method as claimed in claim 19, wherein the steps of selectively suppressing frequency components outside an audio frequency band in at least one of the digital audio signals and the sum signal, and limiting an audio bandwidth of said input signals, are combined in a single stage.

* * * * *